United States Patent
Yuan et al.

(10) Patent No.: US 12,151,992 B2
(45) Date of Patent: Nov. 26, 2024

(54) PREPARATION METHOD FOR UREA CONVERSION-PROMOTING HUMIC ACID SYNERGISTIC

(71) Applicant: INSTITUTE OF AGRICULTURAL RESOURCES AND REGIONAL PLANNING, CHINESE ACADEMY OF AGRICULTURAL SCIENCES, Beijing (CN)

(72) Inventors: Liang Yuan, Beijing (CN); Bingqiang Zhao, Beijing (CN); Yanting Li, Beijing (CN); Zhian Lin, Beijing (CN); Shuiqin Zhang, Beijing (CN); Wei Wang, Shandong (CN)

(73) Assignee: INSTITUTE OF AGRICULTURAL RESOURCES AND REGIONAL PLANNING, CHINESE ACADEMY OF AGRICULTURAL SCIENCES, Beijing (CN)

( * ) Notice: Subject to any disclaimer, the term of this patent is extended or adjusted under 35 U.S.C. 154(b) by 856 days.

(21) Appl. No.: 17/292,320

(22) PCT Filed: Nov. 4, 2019

(86) PCT No.: PCT/CN2019/115374
§ 371 (c)(1),
(2) Date: May 7, 2021

(87) PCT Pub. No.: WO2020/093977
PCT Pub. Date: May 14, 2020

(65) Prior Publication Data
US 2021/0395161 A1 Dec. 23, 2021

(30) Foreign Application Priority Data
Nov. 9, 2018 (CN) .......................... 201811328407.1

(51) Int. Cl.
*C05G 3/90* (2020.01)
*C05C 9/00* (2006.01)
*C05F 11/02* (2006.01)

(52) U.S. Cl.
CPC ............. *C05G 3/90* (2020.02); *C05C 9/005* (2013.01); *C05F 11/02* (2013.01)

(58) Field of Classification Search
CPC .. C05G 3/90; C05G 3/80; C05C 9/005; C05C 9/02; C05C 9/00; C05F 11/02; C05D 1/00
See application file for complete search history.

(56) References Cited

FOREIGN PATENT DOCUMENTS

| | | |
|---|---|---|
| CN | 102584498 A | 7/2012 |
| CN | 102701868 A | 10/2012 |
| CN | 102898254 A | 1/2013 |
| CN | 104788266 A | 7/2015 |
| CN | 109320378 A | 2/2019 |
| JP | 2018058721 A | 4/2018 |

OTHER PUBLICATIONS

International Application No. PCT/CN2019/115374, International Search Report mailed Feb. 11, 2020, 3 pages.

*Primary Examiner* — Jennifer A Smith
(74) *Attorney, Agent, or Firm* — COZEN O'CONNOR

(57) ABSTRACT

The present invention relates to a method for preparing a humic acid-containing synergistic carrier for accelerating urea conversion. The preparation method includes steps of, for example, preparing an extractant for humic acid, preparing a humic acid extract and preparing a humic acid-containing synergistic carrier. Combination of the humic acid-containing synergistic carrier with urea can accelerate urea conversion, and the residual urea rate will be reduced by 22.7%-29.1% than a commercially available urea. The present invention provides a new idea for improving the utilization rate of nitrogen fertilizer in soil with low urease activity. Compared with a commercially available urea, the urea containing the humic acid-containing synergistic carrier of the present invention can increase the rice yield and the utilization rate of nitrogen fertilizer by 9.7% and 8.3%, respectively.

13 Claims, No Drawings

PREPARATION METHOD FOR UREA CONVERSION-PROMOTING HUMIC ACID SYNERGISTIC

PRIORITY CLAIM

This application is a national stage application of PCT/CN2019/115374 filed on Nov. 4, 2019, which claims priority to Chinese App. No. 201811328407.1, filed on Nov. 9, 2018, the entirety of which is incorporated herein by reference.

TECHNICAL FIELD

The present invention belongs to the technical field of fertilizer production, and more particularly relates to a method for preparing a humic acid-containing synergistic carrier for accelerating urea conversion.

TECHNICAL BACKGROUND

Urea is the most important variety of nitrogen fertilizer in China, but it cannot be utilized by crops until transformed into ammonium nitrogen or nitrate nitrogen. In soil with strong acidity or low fertility, the urease activity is extremely low, leading to urea transformation in a slow speed to ammonium nitrogen or nitrate nitrogen which cannot meet the nitrogen requirement for crops at a critical growth period. Moreover, urea is nonpolar, thus it can easily move away from the root region with irrigation water or into a runoff, resulting in nutrient loss and environmental risk. China has abundant and low-cost raw mineral materials of humic acid. However, traditional humic acid has a relatively high molecular weight, and the functional groups such as quinonyl group and keto group can inhibit activity of soil urease, which is unfavorable which is unfavorable to the urea conversion. Current researches about synergistic carrier for urea focus on how to improve the slow release and the stability of urea. Preparation of a humic acid-containing synergistic carrier using the humic acid derived from raw mineral is very important in improving the urea utilization rate under special conditions. However, basic research and product development lag far behind in this aspect.

CN 102584498A discloses a urea containing humic acid and a preparation method thereof, where a synergistic solution with humic acid is prepared by extraction of humic acid from weathered coal/brown coal with a dilute alkaline solution. The synergistic solution is combined with a urea production process to produce a humic acid-containing urea which can inhibit urease activity in soil and reduce loss of nitrogen fertilizer. CN 104725141A discloses a synergist of humic acid for fertilizer which can inhibit ammonia volatilization and a preparation method thereof. The synergist is prepared by the materials composed of humate soil, strain, carbon source, nitrogen source, secondary and trace element, film-forming agent and the like, and is mainly used to coat urea particles to reduce the loss by volatilization. However, there is no patent application and relative information about a humic acid-containing synergistic carrier for accelerating urea conversion at present.

In view of the above, the present inventors carry out a large amount of experimental research and analysis based on the prior art, so as to solve the technical problems existing in the prior art, and thus complete the invention.

CONTENTS OF THE INVENTION

Technical Problem to Be Solved

An objective of the present invention is to provide a method for preparing a humic acid-containing synergistic carrier for accelerating urea conversion.

Technical Solution

The present invention is achieved by the following technical solution.

The present invention relates to a method for preparing a humic acid-containing synergistic carrier for accelerating urea conversion.

The preparation method includes the following steps:

step A. Preparation of an extractant for humic acid
adding 2-5 parts by weight of dimethylformamide and 1-3 parts by weight of potassium sodium tartrate to 100-200 parts by weight of water at 60-70° C., stirring for dissolution, and cooling to obtain the extractant for humic acid;

step B. Preparation of a humic acid extract
adding 100 parts by weight of raw mineral material of humic acid to 800-1,500 parts by weight of the extractant for humic acid obtained in step A, then gradually increasing the temperature to 90° C. under stirring, maintaining at this temperature for 40-60 min, then cooling to room temperature, centrifuging, and removing a precipitate to obtain the humic acid extract; and step C. Preparation of a humic acid-containing synergistic carrier
homogeneously mixing 10% by weight of superphosphoric acid with 5% by weight of nitric acid in a weight ratio of 1:1 to obtain a mixed acid, slowly adding the mixed acid to the humic acid extract obtained in step B to adjust pH of the extract to 1-3, then heating to a temperature of 60-80° C., slowly adding 20-60 parts by weight of hydrogen peroxide (10% by volume) and 5 parts by weight of benzoyl peroxide to 1,000 parts by weight of the humic acid extract obtained in step B under stirring, keeping reaction for 120 min, adding 10 parts by weight of uronic acid, 10 parts by weight of oligosaccharide and 10 parts by weight of sugar alcohol, keeping further reaction for 60 min under stirring, adding 10-20 parts by weight of polyoxyethylene ether and 2-5 parts by weight of phthalate alkylamide, cooling and adjusting pH to 7.5-9.0 by using an aqueous potassium pyrophosphate solution to obtain the humic acid-containing synergistic carrier for accelerating urea conversion.

According to one preferred embodiment of the present invention, in step A, a solution obtained by stirring for dissolution at 60-240 rpm is cooled to lower than 40° C.

According to another preferred embodiment of the present invention, in step B, the raw mineral material of humic acid is weathered coal or brown coal.

According to another preferred embodiment of the present invention, in step B, the raw mineral material of humic acid has a particle size of 150-300 meshes.

According to another preferred embodiment of the present invention, in step B, the centrifuging is performed at 1,000-5,000 rpm for 5-40 min.

According to another preferred embodiment of the present invention, in step C, the uronic acid is glucuronic acid or galacturonic acid.

According to another preferred embodiment of the present invention, in step C, the oligosaccharide is maltooligosaccharide or soybean oligosaccharide.

According to another preferred embodiment of the present invention, in step C, the sugar alcohol is sorbitol, maltitol or xylitol.

According to another preferred embodiment of the present invention, in step C, the concentration of the aqueous potassium pyrophosphate solution is 1-5 mol/L.

According to another preferred embodiment of the present invention, in step C, after adding polyoxyethylene ether and phthalate alkylamide, the obtained solution is cooled to 15-30° C.

The present invention is described in more detail below.

The present invention relates to a method for preparing a humic acid-containing synergistic carrier for accelerating urea conversion.

The preparation method includes the following steps:

Step A. Preparation of an Extractant for Humic Acid adding 2-5 parts by weight of dimethylformamide and 1-3 parts by weight of potassium sodium tartrate to 100-200 parts by weight of water at 60-70° C., stirring for dissolution, and cooling to obtain the extractant for humic acid.

In the present invention, dimethylformamide is an organic base which can react with acidic groups such as carboxyl and phenolic hydroxyl groups in the humic acid to form a water-soluble humic acid, and increase the content of the functional groups, such as methyl and methoxy. Dimethylformamide used in the present invention is a commercially available product, for example, a product sold by Nanjing Kezheng Chemical Co., Ltd. under the trade name "N,N-dimethylformamide (DMF)".

In the present invention, when the amounts of other raw materials are within the above ranges, if the amount of dimethylformamide is less than 2 parts by weight, the extraction rate of humic acid will be reduced; if the amount of dimethylformamide is more than 5 parts by weight, there will be too many bubbles during the extraction of humic acid, and fine impurities will be mixed in the humic acid solution which reduces the purity of an extracted humic acid solution. Therefore, the amount of dimethylformamide is suitably 2-5 parts by weight, and preferably 3-4 parts by weight.

In the present invention, on one hand, potassium sodium tartrate can be used for dissolution and extraction of humic acid, and on the other hand, it can also increase the number of carboxyl and hydroxyl functional groups. Potassium sodium tartrate used in the present invention is a commercially available product, for example, a product sold by Hangzhou Regin Biotechnology Co., Ltd. under the trade name "potassium sodium tartrate".

In the present invention, when the amounts of other raw materials are within the ranges, if the amount of potassium sodium tartrate is less than 1 part by weight, the extraction rate of humic acid will be reduced and the increase of the number of functional groups will be limited; if the amount of potassium sodium tartrate is more than 3 parts by weight, the application effect of the humic acid-containing carrier will be affected due to excess sodium ions. Therefore, the amount of potassium sodium tartrate is suitably 1-3 parts by weight, and preferably 1.5-2.5 parts by weight.

Preferably, the weight ratio of dimethylformamide to potassium sodium tartrate to water is (3-4):(1.5-2.5):(125-175).

According to the present invention, the solution obtained by stirring the raw materials of dimethylformamide and the like at 60-240 rpm for dissolution is cooled to lower than 40° C.

Step B. Extraction of Humic Acid adding 100 parts by weight of raw mineral material of humic acid to 800-1,500 parts by weight of the extractant for humic acid obtained in step A, gradually increasing the temperature to 90° C. under stirring, and maintaining at this temperature for 40-60 min, then cooling to room temperature, centrifuging, and removing a precipitate to obtain the humic acid extract.

According to the present invention, the raw mineral material of humic acid is weathered coal or brown coal.

Weathered coal is a product formed when near-surface or shallow-surface brown coal, bituminous coal, and anthracite coal are prolonged exposed to the erosion from the atmosphere, sunshine, rain and snow, underground water, mineral substances and so on. The total content of humic acid in weathered coal is usually 30%-70%, and can even be more than 80%.

Brown coal is the least coalified mineral coal. It is a brownish black and lackluster low-rank coal between peat and bituminous coal.

According to the present invention, the weathered coal or brown coal is pulverized by using an existing conventional crushing equipment, and the raw mineral material of humic acid with a particle size of 150-300 meshes is collected to prepare a humic acid extract.

In the present invention, when the raw mineral material of humic acid is 100 parts by weight, if the amount of the extractant for humic acid is less than 800 parts by weight, the liquid will be too thick to perform the subsequent centrifugation; if the amount of the extractant is more than 1,500 parts by weight, the water content of the extracted humic acid liquid will be too high, which will affect its use in urea conversion. Therefore, the amount of the extractant for humic acid is suitably 800-1,500 parts by weight.

In this step, the temperature of the mixture of the raw mineral material of humic acid and the extractant for humic acid is gradually increased to 90° C. under stirring at 100-200 rpm, and maintained at this temperature for 40-60 min. It is undesired that the extraction time exceeds the above range. If the extraction time is less than 40 min, the humic acid extraction is incomplete, leading to a loss of the humic acid. If the extraction time exceeds 60 min, the energy consumption and cost for the humic acid extraction will be increased. Therefore, it is desired that the extraction time of the humic acid is 40-60 min.

According to the present invention, the extract cooled to room temperature is centrifuged on a centrifuge at 1,000-5,000 rpm for 5-40 min. The centrifuge is a commercially available product, for example, a product sold by Shanghai Centrifugal Machinery Institute Co., Ltd. under the trade name "two-phase separation decanter centrifuge".

Step C. Preparation of a Humic Acid-Containing Synergistic Carrier mixing 10% by weight of superphosphoric acid with 5% by weight of nitric acid in a weight ratio of 1:1 to obtain a mixed acid, slowly adding the mixed acid to the humic acid extract obtained in step B to adjust pH of the extract to 1-3, then heating to 60-80° C., slowly adding 20-60 parts by weight of hydrogen peroxide (10% by volume) and 5 parts by weight of benzoyl peroxide to 1,000 parts by weight of the humic acid extract under stirring, keeping reaction for 120 min, adding 10 parts by weight of uronic acid, 10 parts by weight of oligosaccharide and 10 parts by weight of sugar alcohol, keeping further reaction for 60 min more under stirring, adding 10-20 parts by weight of polyoxyethylene ether and 2-5 parts by weight of phthalate alkylamide, cooling and adjusting pH to 7.5-9.0 by using an aqueous potassium pyrophosphate solution to obtain the humic acid-containing synergistic carrier for accelerating urea conversion.

In the present invention, superphosphoric acid can be used to adjust the pH of the humic acid liquid and to chelate metal ions such as calcium and magnesium in humic acid. Nitric acid can graft a nitro group to the aromatic ring in humic acid to increase the solubility of humic acid.

In the present invention, hydrogen peroxide can oxidize humic acid into small molecules under acidic conditions. If the pH-adjusted extract has a temperature lower than 60° C. and the amount of hydrogen peroxide is less than 20 parts by weight, the oxidation will be relatively weak. If the pH-adjusted extract has a temperature higher than 80° C. and the amount of hydrogen peroxide is more than 60 parts by weight, the oxidation will be too fast, resulting in the loss of humic acid with low molecular weight.

Benzoyl peroxide is an organic oxidant which can improve the stability of oxidation process. It is a commercially available product, for example, a product sold by Guangzhou Sanming Chemical Co., Ltd. under the trade name "benzoyl peroxide".

Uronic acid is glucuronic acid or galacturonic acid, and the oligosaccharide is maltooligosaccharide or soybean oligosaccharide, and the sugar alcohol is sorbitol, maltitol or xylitol. They are mainly used to increase the content of aldehyde group in humic acid and the content of carbon sources with smaller molecules, and to improve the activity of soil urease. They are commercially available products, for example, a product sold by Beijing Chemsynlab Co., Ltd. under the trade name "D-glucuronic acid", a product sold by Shanghai Guandao Bioengineering Co., Ltd. under the trade name "D-galacturonic acid", a product sold by Shandong Bailongchuangyuan Biotechnology Co., Ltd. under the trade name "maltooligosaccharide", and a product sold by Yucheng Hengyi Biotechnology Co., Ltd. under the trade name "sorbitol".

In the present invention, the polyoxyethylene ether has the properties of both resin and nonionic surfactant. It acts both as a stationary phase to further slow the movement of urea in the soil solution and as a penetrant to promote the bonding of humic acid and urea. In the present invention, the phthalate alkylamide is a nonionic surfactant which not only improves the penetration effect of the polyoxyethylene ether, but also improves the stability of the synergistic carrier. They are commercially available products, for example, a product sold by Jiangsu Hai' an Petrochemical Plant under the trade name "polyoxyethylene ether emulsifier OP-7", a product sold by Guangzhou Zongyu Chemical Co., Ltd. under the trade name "suspension stabilizer TAB-2 phthalate alkylamide".

In the present invention, when the amount of phthalate alkylamide is 2-5 parts by weight, if the amount of the polyoxyethylene ether is less than 10 parts by weight, the dispersibility and permeability will not be significant; if the amount of the polyoxyethylene ether is more than 20 parts by weight, the viscosity of the synergistic carrier will be too high. Therefore, the amount of the polyoxyethylene ether is suitably 10-20 parts by weight.

Likewise, when the amount of the polyoxyethylene ether is 10-20 parts by weight, if the amount of the phthalate alkylamide is less than 2 parts by weight, the permeability of the polyoxyethylene ether will not be significantly improved; if the amount of the phthalate alkylamide is more than 5 parts by weight, the dispersibility of the polyoxyethylene ether will be affected. Therefore, the amount of the phthalate alkylamide is suitably 2-5 parts by weight.

According to the present invention, after adding the polyoxyethylene ether and thephthalate alkylamide, the obtained solvent is cooled to a temperature of 15-30° C.

Potassium pyrophosphate can be used to adjust the solution mixed with the polyoxyethylene ether and the phthalate alkylamide to be weakly alkaline and increase the solubility of calcium or magnesium ion. If the pH is adjusted to be lower than 7.5, the concentration and flowability of the humic acid-containing synergistic carrier will be decreased. If the pH is adjusted to higher than 9, the solution will be highly alkaline which is not suitable for addition to urea. According to the present invention, the concentration of the aqueous potassium pyrophosphoric acid solution is 1-5 mol/L.

The humic acid-containing synergistic carrier prepared by the present invention can be combined with a urea production process or a granular urea product to produce a new urea product with high utilization rate of nitrogen fertilizer.

The present invention provides a method of using the humic acid-containing synergistic carrier as follows:
the first method: in a urea production process, adding 5-50 parts by weight of the humic acid-containing synergistic carrier prepared by the method of the present invention to 1,000 parts by weight of molten urea, and spraying in a tower to obtain a granular urea containing the humic acid-containing synergistic carrier; or
the second method: adding 5-50 parts by weight of the humic acid-containing synergistic carrier prepared by step C to 1,000 parts by weight of granular urea heated to 40-75° C., quickly stirring for 2 min, mixing homogeneously, and drying at 100° C. to obtain a granular urea containing the humic acid-containing synergistic carrier.

Beneficial Effects

The beneficial effects of the present invention lies in the following aspects. The present invention uses a series of organic bases to prepare the extractant for humic acid, and oxidizes humic acid into that with low molecular weight under acidic conditions, and prepares a synergistic carrier containing uronic acid and oligosaccharide. The prepared synergistic carrier in the present invention can increase the activity of soil urease and accelerate the urea conversion to ammonium. Moreover, the present invention provides a method of using the synergistic carrier in combination with urea.

1. The present invention provides a new perspective and a new idea for the development of a humic acid-containing synergistic carrier for urea under special conditions.
2. Combination of the humic acid-containing synergistic carrier with urea can accelerate the urea conversion, and reduce the residual urea rate by 22% or more than a commercially available urea.
3. The prepared synergistic carrier of the present invention can promote the crop root growth, root activity and the fertilizer utilization rate by promoting nutrient absorption. Compared with a commercially available urea, the urea containing the humic acid-containing synergistic carrier of the present invention can increase the rice yield and the utilization rate of nitrogen fertilizer by 9.7% and 8.3%, respectively.

SPECIFIC EMBODIMENT

The present invention will be better understood with reference to the examples below.

I. METHOD EXAMPLES

Example 1: Preparation of a Humic Acid-Containing Synergistic Carrier for Accelerating Urea Conversion The example includes steps as follows:
Step A. Preparation of an Extractant for Humic Acid 2 parts by weight of dimethylformamide and 1 part by weight of potassium sodium tartrate were added to 100 parts by weight of water at 60° C., stirred at 120 rpm for dissolution, and then cooled to lower than 40° C. to obtain the extractant for humic acid;

Step B. Preparation of a Humic Acid Extract 100 parts by weight of weathered coal, raw mineral material of humic acid, with a particle size of 250 meshes were added to 1,500 parts by weight of the extractant for humic acid obtained in step A. The temperature was gradually increased to 90° C. under stirring, and maintained at this temperature for 60 min. Then the mixture was cooled to room temperature and centrifuged at 1000 rpm for 40 min. The precipitate was discarded to obtain the humic acid extract; and Step C. Preparation of a Humic Acid-Containing Synergistic Carrier 10% by weight of superphosphoric acid and 5% by weight of nitric acid were homogeneously mixed in a weight ratio of 1:1 to obtain a mixed acid. The mixed acid was slowly added to the humic acid extract obtained in step B to adjust pH of the extract to 1.0, then heated to 60° C. 20 parts by weight of hydrogen peroxide (10% by volume) and 5 parts by weight of benzoyl peroxide were slowly added to 1,000 parts by weight of the humic acid extract under stirring, and the reaction was kept for 120 min. 10 parts by weight of glucuronic acid, 10 parts by weight of maltooligosaccharide and 10 parts by weight of sorbitol were added, and the reaction was kept for 60 min under stirring. 10 parts by weight of polyoxyethylene ether and 2 parts by weight of phthalate alkylamide were added and cooled to 15° C. A 3 mol/L aqueous potassium pyrophosphate solution was used to adjust pH to 7.5 to obtain the humic acid-containing synergistic carrier for accelerating urea conversion.

Example 2: Preparation of a Humic Acid-Containing Synergistic Carrier for Accelerating Urea Conversion The example includes steps as follows:
Step A. Preparation of an Extractant for Humic Acid 5 parts by weight of dimethylformamide and 3 parts by weight of potassium sodium tartrate were added to 200 parts by weight of water at 70° C., stirred at 60 rpm for dissolution, and then cooled to lower than 40° C. to obtain the extractant for humic acid;

Step B. Preparation of a Humic Acid Extract 100 parts by weight of brown coal, raw mineral material of humic acid, with a particle size of 150 meshes was added to 800 parts by weight of the extractant for humic acid obtained in step A. The temperature was gradually increased to 90° C. under stirring, and maintained at this temperature for 40 min. Then the mixture was cooled to room temperature and centrifuged at 2,000 rpm for 30 min. The precipitate was discarded to obtain the humic acid extract; and Step C. Preparation of a Humic Acid-Containing Synergistic Carrier 10% by weight of superphosphoric acid and 5% by weight of nitric acid were homogeneously mixed in a weight ratio of 1:1 to obtain a mixed acid. The mixed acid was slowly added to the humic acid extract obtained in step B to adjust pH of the extract to 3.0, then heated to 80° C. 60 parts by weight of hydrogen peroxide (10% by volume) and 5 parts by weight of benzoyl peroxide were slowly added to 1,000 parts by weight of the humic acid extract under stirring, and the reaction was kept for 120 min. 10 parts by weight of galacturonic acid, 10 parts by weight of soybean oligosaccharide and 10 parts by weight of maltitol were further added, and the reaction was kept for 60 min under stirring. 20 parts by weight of polyoxyethylene ether and 5 parts by weight of phthalate alkylamide were added and cooled to a temperature of 20° C. 1 mol/L aqueous potassium pyrophosphate solution was used to adjust pH to 9.0 to obtain the humic acid-containing synergistic carrier for accelerating urea conversion.

Example 3: Preparation of a Humic Acid-Containing Synergistic Carrier for Accelerating Urea Conversion The example includes steps as follows:
Step A. Preparation of an Extractant for Humic Acid 3 parts by weight of dimethylformamide and 2 parts by weight of potassium sodium tartrate were added to 160 parts by weight of water at 65° C., stirred at 180 rpm for dissolution, and then cooled to lower than 40° C. to obtain the extractant for humic acid;

Step B. Preparation of a Humic Acid Extract 100 parts by weight of weathered coal, raw mineral material of humic acid, with a particle size of 300 meshes was added to 1,000 parts by weight of the extractant for humic acid obtained in step A. The temperature was gradually increased to 90° C. under stirring, and maintained at this temperature for 54 min. Then the mixture was cooled to room temperature and centrifuged at 5,000 rpm for 5 min. The precipitate was discarded to obtain the humic acid extract; and Step C. Preparation of a Humic Acid-Containing Synergistic Carrier 10% by weight of superphosphoric acid and 5% by weight of nitric acid were homogeneously mixed in a weight ratio of 1:1 to obtain a mixed acid. The mixed acid was slowly added to the humic acid extract obtained in step B to adjust pH of the extract to 2.0, then heated to 74° C. 40 parts by weight of hydrogen peroxide (10% by volume) and 5 parts by weight of benzoyl peroxide were slowly added to 1,000 parts by weight of the humic acid extract under stirring, and the reaction was kept for 120 min. 10 parts by weight of glucuronic acid, 10 parts by weight of soybean oligosaccharide and 10 parts by weight of xylitol were added, and the reaction was kept for 60 min under stirring. 15 parts by weight of polyoxyethylene ether and 3 parts by weight of phthalate alkylamide were added and cooled to 25° C. A 5 mol/L aqueous potassium pyrophosphate solution was used to adjust pH to 8.0 to obtain the humic acid-containing synergistic carrier for accelerating urea conversion.

Example 4: Preparation of a Humic Acid-Containing Synergistic Carrier for Accelerating Urea Conversion The example includes steps as follows:
Step A. Preparation of an Extractant for Humic Acid
4 parts by weight of dimethylformamide and 2.5 parts by weight of potassium sodium tartrate were added to 120 parts by weight of water at 62° C., stirred at 240 rpm for dissolution, and then cooled to lower than 40° C. to obtain the extractant for humic acid;
Step B. Preparation of a Humic Acid Extract
100 parts by weight of brown coal, raw mineral material of humic acid, with a particle size of 200 meshes was added to 1,200 parts by weight of the extractant for humic acid obtained in step A. The temperature was gradually increased to 90° C. under stirring, and maintained at this temperature for 46 min. Then the mixture was cooled to room temperature and centrifuged at 4,000 rpm for 15 min. The precipitate was discarded to obtain the humic acid extract; and
Step C. Preparation of a Humic Acid-Containing Synergistic Carrier
10% by weight of superphosphoric acid and 5% by weight of nitric acid were homogeneously mixed in a weight ratio of 1:1 to obtain a mixed acid. The mixed acid was slowly added to the humic acid extract obtained in step B to adjust pH of the extract to 1.5, then heated to 66° C. 30 parts by weight of hydrogen peroxide (10% by volume) and 5 parts by weight of benzoyl peroxide were slowly added to 1,000 parts by weight of the humic acid extract under stirring, and the reaction was kept for 120 min. 10 parts by weight of galacturonic acid, 10 parts by weight of maltooligosaccharide and 10 parts by weight of sorbitol were added, and the reaction was kept for 60 min under stirring. 18 parts by weight of polyoxyethylene ether and 4 parts by weight of phthalate alkylamide were added and cooled to 30° C. A 2 mol/L aqueous potassium pyrophosphate solution was used to adjust pH to 8.5 to obtain the humic acid-containing synergistic carrier for accelerating urea conversion.

II. TEST EXAMPLES

Test Example 1: Comparison of Residual Urea Rate Between Urea Containing the Humic Acid-Containing Synergistic Carrier and Commercial Urea Sample preparation: The humic acid-containing synergistic carrier prepared in Example 1, Example 2 and Example 4 were respectively added to a granular urea in a weight ratio of 3:100 and cooled to obtain urea containing humic acid A, urea containing humic acid B and urea containing humic acid C, respectively. The commercial urea U (produced by Ruixing Group Co., Ltd. with a nitrogen content of 46%) was used as a control sample.

Test procedure: 1.0 g of commercial urea, the urea containing humic acid A, B or C was weighted to a culture flask, respectively. 100 mL of sterile water was added for dissolution. Then 0.2 g urease (with an enzyme activity about 1 U) was added to each flask, shaken well and placed in a dark incubator for 12 h at 37±2° C. with homogeneously shaking every 2 h during the cultivation. At the end of the cultivation, a diacetyl monoxime colorimetric method specified in HG/T 4135-2010 was used to determine the amount of residual urea in the solution and calculate a residual urea rate according to the following formula:

Residual urea rate (%)=(1−amount of residual urea)×100

The test results were shown in Table 1.

TABLE 1

Comparison of the residual urea rate between the urea containing humic acid and the commercial urea

| Type | Residual urea rate, % | Lower than commercial urea, % |
|---|---|---|
| Commercial urea U | 32.6 | — |
| Urea containing humic acid A | 25.2 | 22.7 |
| Urea containing humic acid B | 21.0 | 35.6 |
| Urea containing humic acid C | 23.1 | 29.1 |

The test results in Table 1 showed that the humic acid-containing synergistic carrier prepared according to the present invention significantly promoted the decomposition and conversion of urea. The residual urea rate of the urea containing humic acid A, B or C was lower than that of the commercial urea by 22.7%, 35.6% or 29.1%, respectively.

Test Example 2: Effect of the Urea Containing Humic Acid of the Present Invention on the Yield of Guangdong Rice and Utilization Rate of Nitrogen Fertilizer The experiment was carried out in Yangcun Town, Boluo County, Huizhou City. The pH of test soil was 5.96, organic matter content 1.16% by weight, total nitrogen content 0.61 g/kg, total phosphorus (P) content 0.62 g/kg, alkali-hydrolyzable nitrogen content 79 mg/kg, Olsen-$P_2O_5$ content 72 mg/kg, and available $K_2O$ content 32 mg/kg. The soil was a paddy soil developed from sand shale.

The same amounts of phosphorus and potassium (this test used 3.6 kg/mu of $P_2O_5$ and 8.4 kg/mu of $K_2O$) were applied and the treatments were arranged as follows:

Treatment 1: control (CK), with no nitrogen fertilizer;

Treatment 2: urea containing humic acid (HAU, 12 kg N/mu, using the humic acid-containing carrier prepared in Example 4);

Treatment 3: commercial urea U (12 kg N/mu).

Each treatment was carried out for 4 repeats, and arranged in random block. The cell area was 3.8 m×6.4 m=24.32 $m^2$. The variety of the test rice was Yuejingsimiao (high quality rice). There were 17×26=442 plants per cell area and 3-4 seedlings per plant. One third of nitrogen fertilizer was applied as the base fertilizer. The rest was divided into two parts, and applied as topdressing at the tillering stage and the inflorescence differentiation stage, respectively. The phosphorus fertilizers in all treatments were applied as base fertilizers. 50% of the potassic fertilizer was applied as base fertilizer, and another 50% as topdressing at the inflorescence differentiation stage.

TABLE 2

Comparison the urea containing humic acid of the present invention with the commercial urea in term of the rice grain yield and the utilization rate of nitrogen fertilizer

| Treatment | Block I | Block II | Block III | Block IV | Average (kg/block) | Yield per mu (kg) | Utilization rate of nitrogen fertilizer (%) |
|---|---|---|---|---|---|---|---|
| CK  | 9.3  | 9.5  | 9.4  | 9.7  | 9.5  | 259.7 | / |
| HAU | 14.3 | 14.6 | 14.7 | 14.3 | 14.4 | 396.8 | 22.3 |
| U   | 13.2 | 12.9 | 13.5 | 13.2 | 13.2 | 361.8 | 30.6 |

It can be seen from the results in table 2 that the urea containing humic acid of the present invention increased the rice yield and the utilization rate of nitrogen fertilizer by 9.7% and 8.3%, respectively.

It can be seen that, combination of the humic acid-containing synergistic carrier prepared by the present invention with urea can promote decomposition and conversion of urea. The present invention provides a new idea for improving utilization rate of nitrogen fertilizer in soil with low urease activity.

What is claimed is:

1. A method for preparing a humic acid-containing synergistic carrier for accelerating urea conversion, wherein the method comprises the following steps:

step A Preparation of an extractant for humic acid adding 2-5 parts by weight of dimethylformamide and 1-3 parts by weight of potassium sodium tartrate to 100-200 parts by weight of water at a temperature of 60-70° C., stirring for dissolution, and cooling to obtain the extractant for humic acid;

step B Preparation of a humic acid extract adding 100 parts by weight of raw mineral material of humic acid to 800-1,500 parts by weight of the extractant for humic acid obtained in step A, gradually increasing the temperature to 90° C. under stirring, maintaining at this temperature for 40-60 min, then cooling to room temperature, centrifuging, and discarding precipitate, if any is formed, to obtain the humic acid extract; and step C Preparation of a humic acid-containing synergistic carrier mixing homogeneously 10% by weight of superphosphoric acid with 5% by weight of nitric acid in a weight ratio of 1:1 to obtain a mixed acid, slowly adding the mixed acid to the humic acid extract obtained in step B to adjust pH of the extract to 1-3, then heating to a temperature of 60-80° C., slowly adding 20-60 parts by weight of hydrogen peroxide with a concentration of 10% by volume and 5 parts by weight of benzoyl peroxide to 1,000 parts by weight of the pH-adjusted humic acid extract under stirring, maintaining the hydrogen peroxide/benzoyl peroxide/pH-adjusted humic acid extract reaction for 120 min, adding 10 parts by weight of uronic acid, 10 parts by weight of oligosaccharide and 10 parts by weight of sugar alcohol, further maintaining the hydrogen peroxide/benzoyl peroxide/pH-adjusted humic acid extract/uronic acid reaction for 60 min under stirring, adding 10-20 parts by weight of polyoxyethylene ether and 2-5 parts by weight of phthalate alkylamide, cooling and adjusting pH to 7.5-9.0 by using an aqueous potassium pyrophosphate solution to obtain the humic acid-containing synergistic carrier for accelerating urea conversion.

2. The method for preparing a humic acid-containing synergistic carrier according to claim 1, wherein in step A, a solution obtained by stirring for dissolution at 60-240 rpm is cooled to a temperature of lower than 40° C.

3. The method for preparing a humic acid-containing synergistic carrier according to claim 1, wherein in step B, the raw mineral material of humic acid is weathered coal or brown coal.

4. The method for preparing a humic acid-containing synergistic carrier according to claim 1, wherein in step B, the particle size of the raw mineral material of humic acid is 150-300 meshes.

5. The method for preparing a humic acid-containing synergistic carrier according to claim 1, wherein in step B, the centrifuging is performed at 1,000-5,000 rpm for 5-40 min.

6. The method for preparing a humic acid-containing synergistic carrier according to claim 1, wherein in step C, the uronic acid is glucuronic acid or galacturonic acid.

7. The method for preparing a humic acid-containing synergistic carrier according to claim 1, wherein in step C, the oligosaccharide is maltooligosaccharide or soybean oligosaccharide.

8. The method for preparing a humic acid-containing synergistic carrier according to claim 1, wherein in step C, the sugar alcohol is sorbitol, maltitol or xylitol.

9. The method for preparing a humic acid-containing synergistic carrier according to claim 1, wherein in step C, the concentration of the aqueous potassium pyrophosphate solution is 1-5 mol/L.

10. The method for preparing a humic acid-containing synergistic carrier according to claim 1, wherein in step C, after adding the polyoxyethylene ether and phthalate alkylamide, the obtained solution is cooled to 15-30° C.

11. A humic acid-containing synergistic carrier obtained according to claim 1.

12. A urea composition containing a urea and the humic acid-containing synergistic carrier obtained according to claim 1.

13. A process for producing the urea composition according to claim 12, comprising the following steps:

during the production process of the urea composition,
adding 5-50 parts by weight of the humic acid-containing synergistic carrier to 1,000 parts by weight of a molten urea, and spraying in a tower to obtain a granular urea composition containing the humic acid-containing synergistic carrier; or adding 5-50 parts by weight of the humic acid-containing synergistic carrier to 1,000 parts by weight of a granular urea heated to a temperature of 40-75° C., quickly stirring for 2 min, mixing homogeneously, and drying at a temperature of 100° C. to obtain a granular urea composition containing the humic acid-containing synergistic carrier.

* * * * *